(12) United States Patent
Kamiya

(10) Patent No.: US 6,885,639 B2
(45) Date of Patent: Apr. 26, 2005

(54) PACKET SWITCH AND PACKET SWITCHING METHOD

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 902 days.

(21) Appl. No.: 09/734,695

(22) Filed: Dec. 13, 2000

(65) Prior Publication Data

US 2001/0004362 A1 Jun. 21, 2001

(30) Foreign Application Priority Data

Dec. 15, 1999 (JP) .......................................... 11/355382

(51) Int. Cl.[7] .......................... H04L 12/56; H04Q 11/04
(52) U.S. Cl. ...................... 370/235; 370/254; 370/376; 370/388; 370/395.4; 370/443
(58) Field of Search ................ 370/230, 231, 370/235, 254, 357, 360, 375, 376, 388, 389, 395.1, 395.4, 412, 413, 414, 415, 416, 442, 443, 468; 340/2.1, 2.2, 2.21, 3.1, 3.2, 3.21; 398/43, 52, 98

(56) References Cited

U.S. PATENT DOCUMENTS

| | | | | |
|---|---|---|---|---|
| 5,130,975 A | * | 7/1992 | Akata | .......................... 370/416 |
| 5,631,908 A | * | 5/1997 | Saxe | ........................... 370/235 |
| 6,044,061 A | * | 3/2000 | Aybay et al. | ............... 370/230 |
| 6,185,221 B1 | * | 2/2001 | Aybay | ......................... 370/412 |
| 6,570,873 B1 | * | 5/2003 | Isoyama et al. | ............ 370/375 |

FOREIGN PATENT DOCUMENTS

| | | |
|---|---|---|
| DE | 195 40 160 A1 | 10/1995 |
| EP | 0 432 800 B1 | 8/1997 |
| JP | 4-58644 | 2/1992 |
| JP | 4-271546 | 9/1992 |
| JP | 6-233337 | 8/1994 |
| JP | 8-223213 | 8/1996 |

OTHER PUBLICATIONS

A. Smiljanic, et al., "RRGS * Round Robin Greedy Scheduling for Electrin/Optical Terabit Switches", in Globecom, 1999.

Japanese Office Action dated Jul. 7, 2003 with English translation of pertinent portions.

Japanese Office Action dated Dec. 9, 2003 wiyh English translation of pertin portions.

German Office Action dated Aug. 11, 2004.

English translation of German Office Action.

* cited by examiner

*Primary Examiner*—Alpus H. Hsu
(74) *Attorney, Agent, or Firm*—Whitham, Curtis & Christofferson, PC

(57) ABSTRACT

For achieving elimination of unfairness between ports, reserved output port information transferred between respective modules is input to switch out of the module to vary destination of output. The module and the switch operate in synchronism with the frame for which the connection grant process of a plurality of time slot is performed to vary connection topology so that all connection topology appear. By variation of connection topology, variation combination of adjacent port appear to shuffle preference for the input port which is otherwise held fixed for resolving unfairness relating to reservation chance of the input port.

20 Claims, 14 Drawing Sheets

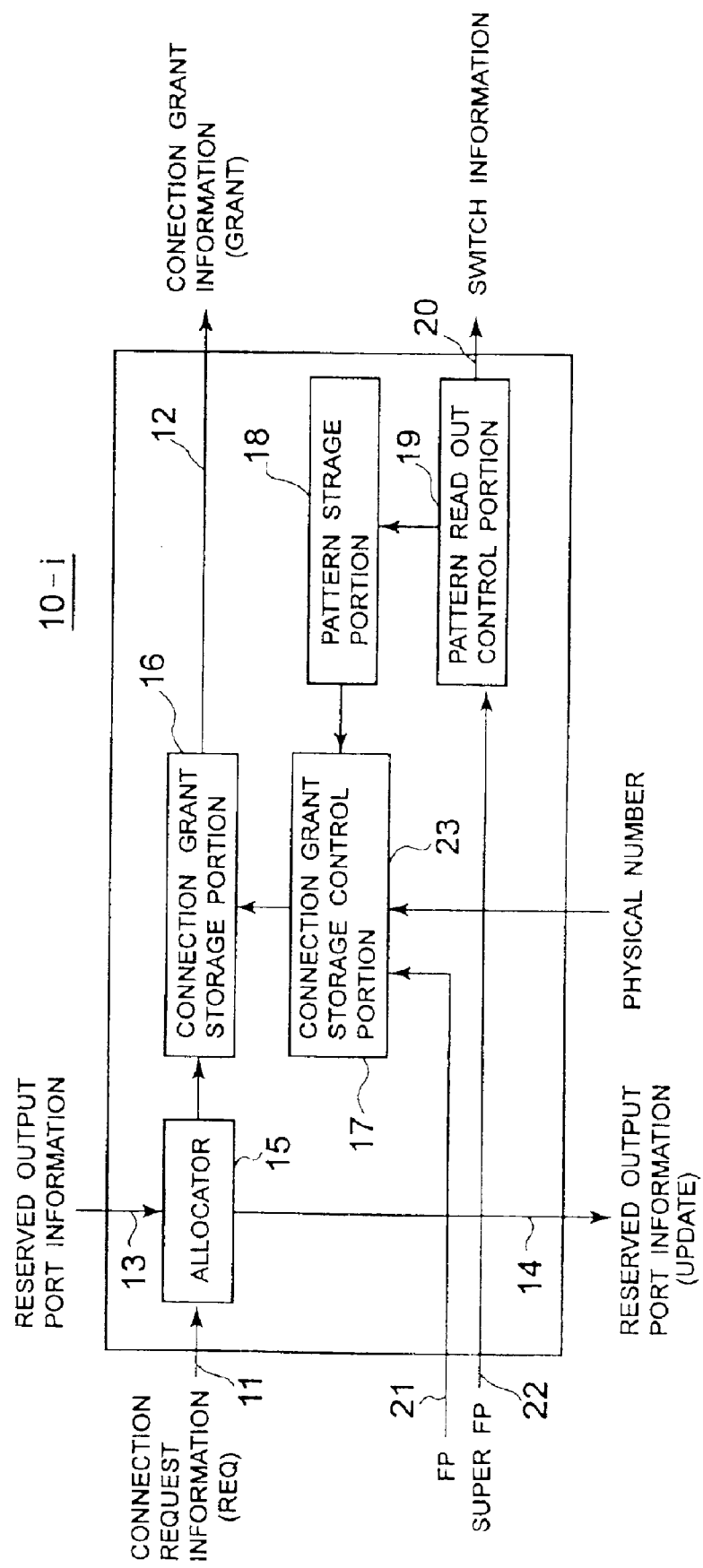

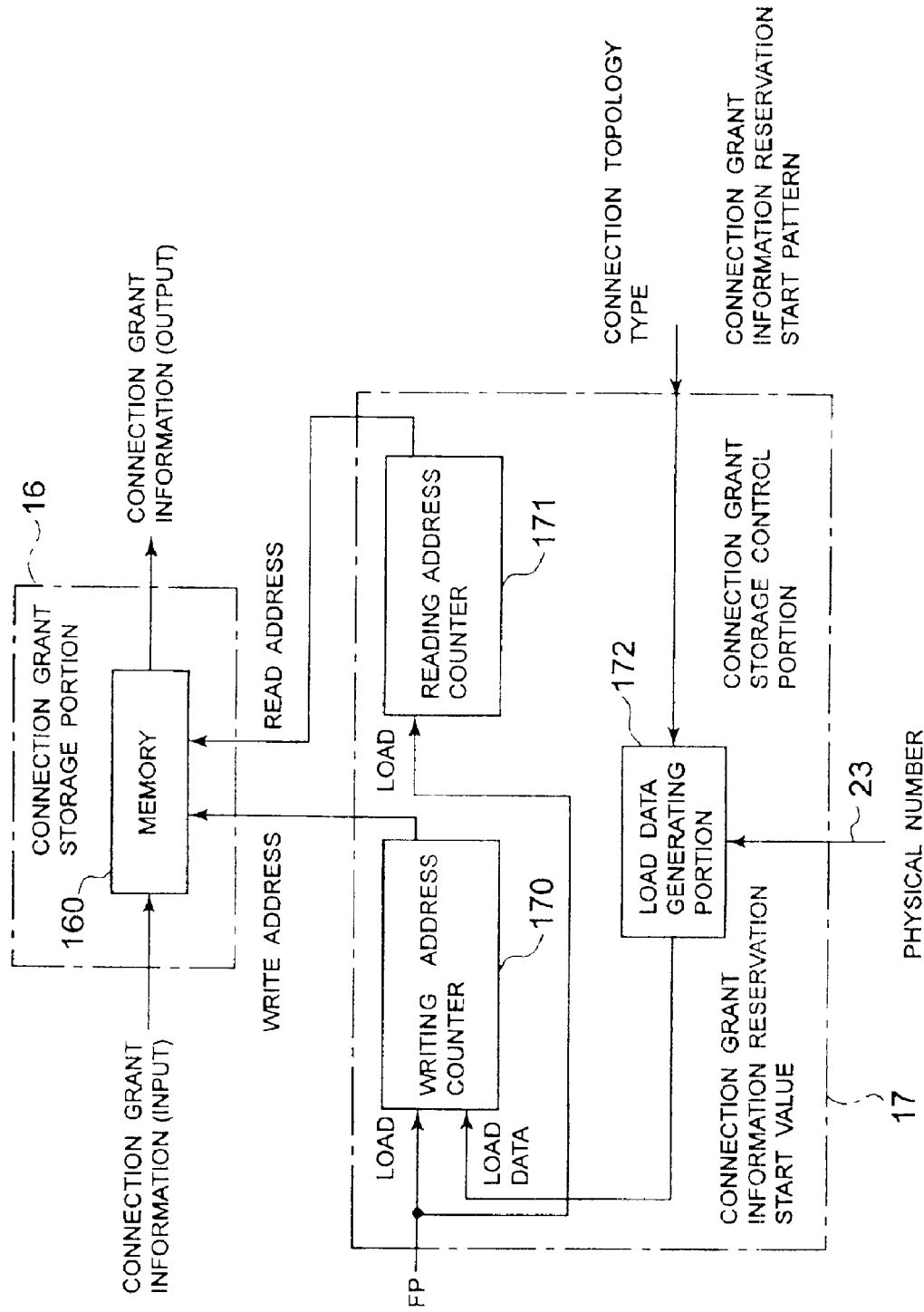

FIG.6A

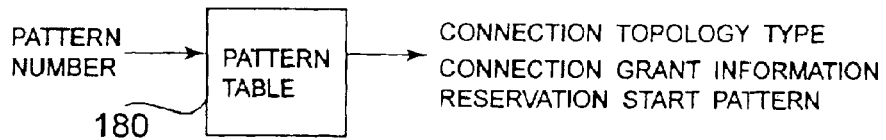

PATTERN NUMBER → PATTERN TABLE 180 → CONNECTION TOPOLOGY TYPE / CONNECTION GRANT INFORMATION RESERVATION START PATTERN

FIG.6B

| PATTERN NUMBER | CONNECTION GRANT INFORMATION RESERVATION START PATTERN | CONNECTION TOPOLOGY TYPE |
|---|---|---|
| 0 | TYPE # A | TYPE # 1 |
| 1 | | TYPE # 2 |
| 2 | | TYPE # 3 |
| 3 | | TYPE # 4 |
| 4 | | TYPE # 5 |
| 5 | | TYPE # 6 |

FIG.6C

| PATTERN NUMBER | CONNECTION GRANT INFORMATION RESERVATION START PATTERN | CONNECTION TOPOLOGY TYPE |
|---|---|---|
| 0 | TYPE # A | TYPE # 1 |
| 1 | TYPE # B | |
| 2 | TYPE # C | |
| 3 | TYPE # D | |

FIG.6D

| PATTERN NUMBER | CONNECTION GRANT INFORMATION RESERVATION START PATTERN | CONNECTION TOPOLOGY TYPE |
|---|---|---|
| 0 | TYPE # A | TYPE # 1 |
| 1 | TYPE # B | |
| 2 | TYPE # C | |
| 3 | TYPE # D | |
| 4 | TYPE # A | TYPE # 2 |
| 5 | TYPE # B | |
| 6 | TYPE # C | |
| 7 | TYPE # D | |
| ⋮ | ⋮ | ⋮ |
| 20 | TYPE # A | TYPE # 6 |
| 21 | TYPE # B | |
| 22 | TYPE # C | |
| 23 | TYPE # D | |

PACKET SWITCH AND PACKET SWITCHING METHOD

BACKGROUND OF THE INVENTION

1. Field of the Invention

The present invention relates generally to a packet switch. More particularly, the invention relates to a packet switch for scheduling between input and output in a packet switching system and realizing the scheduling.

2. Description of the Related Art

In the recent packet switching system, an input buffer type switch having N in number of inputs and N in number of outputs (N is natural number: the same shall be applied hereinafter) and, in which each input portion has N in number of virtual output queuing (VOQ), is typically employed.

FIG. 11 shows a construction of a typical input buffer type packet switch having N inputs and N outputs (N is natural number: the same shall be applied hereinafter). Referring to FIG. 11, a packet switch 40 has a plurality of input ports inputting data, a plurality of output ports outputting data, a data switching element 54 switching data input from the input port to transfer to the output port and a scheduler 50 controlling the switching element.

The input port has a construction of a virtual output queuing (VOQ) 52. As the switching element 54, a cross-bar switch is typically employed. The scheduler 50 employs a distributed scheduling construction, and is consisted of distributed scheduling modules 51-$i$ (i=1 to N) per the input port.

The packet switch set forth above is assumed to perform transfer in the cross-bar switch with a fixed size packet. By this, an operation period of the switch system is quantized. A unit for quantization is referred to as time slot.

The scheduler receives a connection request information (REQ) per the output port from the input port per time slot to determine connection grant information (GRANT) between the input port and the output port on the basis of the connection request information. The scheduler generates a connection information (MSEL) between the input port and the output port on the basis of the connection grant information to notify to the switching element for setting connection of the input and output of the switching element.

On the other hand, the scheduler generates a transfer grant information (DSTMSG) indicative of the output port granted data transfer from each input port on the basis of the connection grant information to notify the transfer grant information for each input port. The input port outputs data to the switching element according to the transfer grant information to complete switching by reception of data to the output port.

A task of the scheduler is to generate the N×N connection grant information from the N×N connection request information. Upon generation of the connection grant information, each distributed scheduling modules 51-1 to 51-N determine permission and rejection of connection of the individual input port to the output port.

The output port granted connection by a certain distributed scheduling module 51-$n$ (n is natural number $1 \leq n \leq N$) is a port "reserved" for other distributed scheduling module for another distributed scheduling module 51-$m$ (m≠n) and becomes the port impossible to issue connection grant. Hereinafter, operation for determining connection grant to the output port by certain scheduling module is expressed as "reserve output port".

As a distributed type scheduling algorithm of the packet switch, there is a round robin greedy scheduling (RRGS) algorithm reported in A. Smiljanic, R. Fan and G. Ramanurthy "RRGS* Round Robin Greedy Scheduling for Electric/Optical Terabit Switches" in Globecom, 1999.

In case of the scheduler employing the RRGS algorithm, the distributed scheduling module is connected in ring form for transferring message between adjacent distributed scheduling module. In the RRGS algorithm, reservation (connection grant determination) of time slot to be an object of the distributed scheduling module is performed to transfer the resultant information to the next distributed scheduling module. In order to ease message transfer speed demand condition, RRGS introduces a pipeline function. A reservation process of the time slot is completed upon completion of message transfer between respective distribution scheduling modules in one cycle. On the other hand, N in number of distributed scheduling module makes reservation for at least N slots ahead of the current slot. Furthermore, the RRGS algorithm progresses the reservation process for N time slots with shifting phase per one time slot.

On the other hand, as a modification of the RRGS algorithm, it can be considered an algorithm, in which reservation process for a plurality of time slots are started simultaneously from respectively different distributed scheduling modules to progress for completing simultaneously. Such algorithm is referred to as a framed RRGS.

FIG. 12 is a block diagram showing a construction of the packet switch with the distributed type scheduler employing the RRGS and framed RRGS. In FIG. 12, as an example, a system having four ports (N=4). In FIG. 12, the scheduler 1 is constructed with input modules (IM) 10-1 to 10-4 for performing distributed type scheduling. For each module 10-$i$ (i=1 to 4), a frame pulse (FP) 21 indicative of the leading end of the frame and a super frame pulse (SuperFP) indicative of the leading end of a super frame. Each module 10-$i$ operates in synchronism with the frame pulse 21 or the super frame pulse 22.

On the other hand, in each module 10-$i$, a physical number 23 is set for identification of the module. The connection request information 11 is input to the module 10-$i$ from each input port for negotiation of the connection request. Each module 10-$i$ outputs the connection grant information 12-1 to 12-4 representative of determined reservation (connection grant) resulting from negotiation.

In the RRGS and the framed RRGS, conflict of the connection demand for the output port is avoided by transferring "reserved output port information" as information degenerated input port information from the connection grant information (information generated with reference to the input port information) between adjacent distributed scheduling modules. For example, the module 10-3 receives the reserved output port information 14-2 from the preceding module 10-2 as reserved output port information 13-3 for use in negotiation for the connection request. After determination of the connection grant information, the reserved output port information 14-3 is notified to the module 10-4 in the next stage.

FIG. 13 is an illustration showing an example of general operation of the framed RRGS. Operation of the framed RRGS will be discussed hereinafter with reference to FIGS. 12 and 13.

Transfer direction of the reversed output port information in module number is #1→#2→#3→#4→#1→#2

Polarities of respective information are defined as follow. The connection request of each input port is 1 when the request is present and 0 when no request is present. The connection grant information (reserve information) is 1 when connection is granted (reserved) and 0 when connection is inhibited (non-reserved). The reserved output port information is 1 as reserved and 0 as not reserved.

In the shown example one frame consists of four time slots and the frame pulse 21 is input in four time slot periods. Also, the super frame pulse 2 is not used in the shown example.

In FIG. 13, when the frame pulse 21 is input to the modules 10-1 to 10-4 at a time slot TS1, the module 10-1 at first makes determination for the connection grant information of the input port 1 for the time slot TS1 of the next frame. Since this is the first determination, the reserved output port information of respective output ports are (0, 0, 0, 0) from the output port 1 to the output port 4 in sequential order. It is assumed that the connection request of the input port 1 is (0, 1, 0, 1) from the output port 1 to the output port 4 in sequential order. When the module 10-1 selects the output port 2, the module 10-1 stores the output port 2 as the connection grant information at the time slot TS1 for the next frame. Then, the reserved output port information (0, 1, 0, 0) is notified to the module 10-2.

Subsequently, at the time slot TS2, the module 10-2 determines the connection grant information of the input port 2 at the time slot TS1 for the next frame. Then, the module 10-2 receives the reserved output port information (0, 1, 0, 0). It is assumed that the connection request of the input port 2 is (0, 1, 1, 1) since the connection request cannot be assigned to the output port 2 since the output port 2 has already been reserved, the module 10-2 rejects connection request to the output port 2 for selecting the output port granting the connection request among the output ports 3 and 4. Here, it is assumed that the output port 3 is selected for granting the connection request. Then, the module 10-2 stores the output port 3 as the connection grant information at the time slot TS5 to notify the reserved output port information (0, 1, 1, 0) to the module 10-3.

Then, at time slot TS3, the module 10-3 and at time slot TS4, the module 10-4 determine the connection grant information at time slot TS1 for the next frame. At the timing where the time slot TS4 is completed, respective modules have the connection grant information at the time slot TS1 for the next frame, 4×4 connection grant information at the time slot TS1 for the next frame is fixed.

Furthermore, in the foregoing process procedure, at the time slot TS1, the module other than the module 10-1 starts "reservation" for respectively different time slots. For example, the module 10-2 starts reservation for time slot TS4 for the next frame, the module 10-3 starts reservation for time slot TS3 for the next frame and the module 10-4 starts reservation for the time slot TS2.

Respective modules performs process of respective reserved time slots at the relevant time slots, the reserved output information of the relevant reserved time slot is transferred to respective modules of next stages to perform scheduling process so that respective modules 10-1 to 10-4 will not have non-operation period. At a timing where the time slot TS4 is completed, respective modules have the connection grant information from the time slots TS1 to TS4 in the next frame, 4×4 connection grant information from the time slots TS1 to TS4 of the next frame is fixed.

FIG. 14 is an illustration showing the order of reservation (connection grant determination) of respective module. FIG. 14 shows the example of the case of 4×4 scheduler. Horizontal axis represents a time, in which one frame is consisted of four time slots. Vertical axis represent physical number of the modules. Transfer direction of the reserved output port information is #1→#2→#3→#4→#1→#2 . . . in physical number of the modules. Figures in the matrix represent number of the time slot in the next frame to reserve.

As shown in FIG. 14, the module having the physical number #1 is the leading module (time slot TS1) of the frame and starts from reservation of the time slot TS1 of the next frame. Similarly, the module of the physical number #2 starts reservation from the time slot TS4, the module of the physical number #3 starts reservation from the time slot TS3, and the module of the physical number #4 starts reservation from the time slot TS2.

When the foregoing conventional algorithm is employed, the following problems are encountered.

At first, when more than or equal to two and less than total number of ports input uniform traffic, ratio of obtaining of reservation (connection request process) between the ports becomes unfairness. In RRGS, since the scheduler having chance of making reservation at earlier timing on the pipeline has higher preference in reservation, probability of obtaining chance of connection becomes higher. Accordingly, the scheduler having earlier reservation chance is absolutely dominant in making reservation. This characteristics is caused by fixed connection topology of the modules. For this characteristics, unfairness is caused in obtaining chance of connection between adjacent ports.

In this respect, discussion will be given in terms of example of FIGS. 12 and 14. It is assumed that data to the output port 3 is accumulated in the input ports 1 and 2, and no other data is present. In this case, a connection request from the input port 1 to the output port 3 and a connection request from the input port 2 to the output port 3 are transmitted to every time slots. Considering fairness between the ports, two kinds of connection requests are to be process in 1:1 manner.

However, referring to FIG. 14, in the scheduler, the input port 2 may have a chance to obtain reservation for the output port 3 at earlier timing than the input port 1 at reservation in the time slot 4, and in other time slots, the input port 1 may have a chance to obtain reservation for the output port 3 at earlier timing than the input port 2. Accordingly, the process ratio becomes 75% at the input port 1 side and 25% at the input port 2 side. In general, considering the foregoing phenomenon in the adjacent two ports among N ports, obtaining ratio of port on upstream side and downstream side becomes N−1:1. Degree of unfairness is increased according to increasing of number of ports. This problem occur in adjacent two or more and N−1 or less ports. When number of adjacent ports is m, the obtaining ratio of the port between the most upstream side port and other port is N−m+1:1: . . . 1 (number of term is m).

Next, the second problem is occurrence of unfairness between the ports in terms of process delay (a period to connection grant response for the connection request) in the same frame. In the shown example, the starting order of the time slot to be reserved in the frame by respective modules is fixed. Therefore, in certain module, the time slot given the chance of reservation at the first timing is the leading time slot in the frame, and in other module, the time slot given the chance of reservation at the first timing becomes the last time slot in the frame.

As set forth above, in the conventional algorithm, the scheduler having earlier reservation chance at earlier timing on the pipeline has higher probability. Therefore, the scheduler having the earliest reservation chance is absolutely dominant in making reservation. When the transmission timing of the time slot having the first reservation chance in each module 10 is fixed, time differences to reservation for the connection request arriving at the same timing between the modules become unfair to cause unfairness in delay timing resulting in unfairness of the cell transmission.

In this point, an example of the case of FIGS. 12 and 14 set forth above will be discussed. Considering reservation of connection of respective modules 10-1 to 10-4 in the time slot TS1 as the leading time slot of the frame, the module 10-1 performs reservation of the time slot TS1 of the next frame at the leading end of the frame. The module 10-2 performs reservation of the time slot TS4 of the next frame at the leading end of the frame. The module 10-1 may make reservation of the slot at the earliest timing. On the other hand, the module 10-2 makes reservation of the time slot at the latest timing. For the connection request arriving at the same timing, the module 10-1 may make reservation of the time slot at earlier timing than other modules 10-2 to 10-4.

SUMMARY OF THE INVENTION

The present invention has been worked out for solving the problem in the prior art. It is therefore an object of the present invention to provide a packet switching which can resolve unfairness between ports by a simple optional function and a packet switching method in the packet switch.

According to the first aspect of the invention, a packet switch for controlling flow of data in a network, comprises:

a plurality of input ports; a plurality of output ports;

a scheduler having N (natural number) in number of input port scheduling modules reserving a particular input port among the plurality of input ports for feeding data to a designated output port among the plurality of output ports and determining connecting condition between the input port and the output port, in the scheduler, each of the scheduling module receiving reservation condition information of a certain time slot from the scheduling module in the preceding stage and determining permission or rejection of reservation of packet transmission from the input port scheduling module in the reservation time slot, per time slot the scheduling module including means for reservation of packet transmission referring the reservation condition information received from the scheduling module in the preceding stage and the reservation request of own scheduling module and transmitting the result of the reservation of packet transmission to the scheduling module in the next stage;

means for defining a frame consisted of N in number of time slots and performing reservation in N time slots in a next frame in a current frame period;

means, in the current scheduling module, for receiving said reservation condition information from the preceding scheduling module;

means, in the current scheduling module, for preliminarily determining a future time slot to access one of said plurality of output ports as the particular time slot in the next frame;

means for selecting one of said plurality of output ports for reservation for transmitting in said future time slot;

means for making judgment whether said future time slot has already been reserved by another scheduling module;

means for making reservation of said future time slot when said future time slot is not reserved by another scheduling module and putting information indicating that said future time slot is reserved in said reservation condition information;

means for transferring said reservation condition information to next scheduling module, considering in viewpoint of reservation process in the time slot, said reservation process being initiated simultaneously at the leading end of the frame, being progressed simultaneously in pipeline process, and completing simultaneously at the end of the frame;

said input port scheduling module having means for initiating process for respectively different reservation time slot in the next frame in each of a plurality of said reservation processes which are initiated simultaneously at the leading end of the frame; and reservation order varying means for varying order of said reservation by said plurality of scheduling module, said plurality of scheduling modules making reservation of ports to output with respect to a packet for next frame per each frame in the varied order.

A plurality of scheduling modules performs said reservation in an order corresponding to logical connection order relative to other modules, said reservation order varying means varies a connection topology of said plurality of scheduling modules. The reservation order varying means includes a switch performing switching operation for varying logical connecting condition of said plurality of scheduling modules and a table storing control data for controlling switching operation of said switch. Physical connection between said plurality of scheduling module and said switch is an electrical connection or an optical connection.

The table is provided in each of said plurality of scheduling modules. In the alternative the table is provide in common for said plurality of scheduling modules. The control data is data for controlling switching operation of said switch for varying time slot for initiating reservation of said plurality of scheduling modules per each frame at the leading end of each frame. The control data is data for realizing scheduling equalizing use frequency of reservation start slot for initiating said reservation by a plurality of scheduling modules. The control data is data for realizing scheduling equalizing use order and use frequency of reservation start slot for initiating said reservation by a plurality of scheduling modules.

According to another aspect of the invention, a packet switching method for determining connecting condition between input ports and output ports by making reservation for particular input port among a plurality of input ports for feeding data to a designated output port among a plurality of output ports in a scheduler of a switch having N in number of input port scheduling modules, comprising:

step of receiving reservation condition information of a certain time slot from the scheduling module in the preceding stage;

step of determining permission or rejection of reservation of packet transmission from said input port scheduling module in said reservation time slot, per time slot;

step of reservation of packet transmission referring the reservation condition information received from the scheduling module in the preceding stage and the reservation request of own scheduling module and transmitting the result of the reservation of packet transmission to the scheduling module in the next stage;

means, in the current scheduling module, for receiving said reservation condition information from the preceding scheduling module;

means, in the current scheduling module, for preliminarily determining a future time slot to access one of said plurality of output ports as the particular time slot in the next frame;

step of selecting one of said plurality of output ports for reservation for transmitting in said future time slot;

step of making judgment whether said future time slot has already been reserved by another scheduling module;

step of making reservation of said future time slot when said future time slot is not reserved by another scheduling module and putting information indicating that said future time slot is reserved in said reservation condition information;

step of transferring said reservation condition information to next scheduling module, considering in viewpoint of reservation process in the time slot, said reservation process being initiated simultaneously at the leading end of the frame, being progressed simultaneously in pipeline process, and completing simultaneously at the end of the frame;

step of initiating process for respectively different reservation time slot in the next frame in each of a plurality of said reservation processes which are initiated simultaneously at the leading end of the frame; and reservation order varying step of varying order of said reservation by said plurality of scheduling modules, and making reservation of ports to output with respect to a packet for next frame per each frame in the varied order.

The plurality of scheduling modules performs said reservation in an order corresponding to logical connection order relative to other modules, said reservation order varying means varies a connection topology of said plurality of scheduling modules. A plurality of scheduling modules performs reservation in the order corresponding to the logical connection order with other modules. In variation of the reservation order, a plurality of scheduling modules varies connection topology.

The reservation order varying means includes a switch performing switching operation for varying logical connecting condition of said plurality of scheduling modules and a table storing control data for controlling switching operation of said switch. The physical connection between said plurality of scheduling modules and said switch is an electrical connection or optical connection. The table is provided in each of said plurality of scheduling modules. In the alternative, the table is provide in common for said plurality of scheduling modules.

The control data is data for controlling switching operation of said switch for varying time slot for initiating reservation of said plurality of scheduling modules per each frame at the leading end of each frame. The control data is data for realizing scheduling equalizing use frequency of reservation start slots for initiating said reservation by a plurality of scheduling modules. The control data is data for realizing scheduling equalizing use order and use frequency of reservation start slots for initiating said reservation by a plurality of scheduling modules.

In short, the present invention realizes the input buffer type packet switch includes a virtual output queue as input buffer construction and the cross-bas switch as data switch element. Then, each module determines connection information of the input port and the output port of the cross-bas switch of certain time slot with respect to the connection request from each VOQ.

As set forth above, there are two unfairness in the RRGS and the framed RRGS. Namely, at first, as common program of the RRGS and the framed RRGS is unfairness in terms of connection reservation chance between adjacent ports (first unfairness). On the other hand, secondary, a problem relating to the framed RRGS for unfairness in terms of process delay in the same frame up to the connection grant response for the connection request between the ports (second unfairness).

Therefore, in the present invention, in order to resolve the first unfairness, the present invention takes a construction which permits variation of the connection topology between the modules. As apparatus, the reserved output port information transferred between the modules is input to the switch out of the module to vary the destination of output. The module and the switch operates in synchronism with the frame by performing connection grant process of a plurality of time slots for varying the connection topology per frame so that all connection topology may appear.

By varying connection topology, various combinations of adjacent ports appear to shuffle preference which is otherwise held in fixed condition. Thus, unfairness in terms of reservation chance of the input port can be resolved, Also, by preparing only patterns of particular connection topologies or by varying ratio of application of respective patterns with weighting application frequency of the pattern, it can realize control for increasing frequency of preferentially assigned port for particular input port or a plurality of particular input ports.

In order to solve the second unfairness, the process order of the reservation time slot in the process frame in the module is varied per frame. As apparatus, each module operates in synchronism with the frame to vary order pattern of the reservation time slot per module. Varying the order pattern of the reservation time slot by each module in synchronism, the average value of the delay period in connection grant response for the connection request which is held in fixed condition, can be varied.

By this, average value can be equalized and unfairness in process delay of the input port can be resolved. On the other hand, by preparing and using only order pattern of the particular reservation time slot and varying application ratio of respective patterns by providing weighting in application frequency of the pattern, preferential control relating to process delay for the particular input or a plurality of particular input ports can be realized.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings:

FIG. 4 is a block diagram showing an example of construction of each module in FIG. 1;

FIG. 5 is an illustration showing an example of an internal construction of a connection grant storage portion and a connection grant storage control portion in FIG. 4;

FIG. 6A is an illustration showing an example of construction of a pattern storage portion in FIG. 4;

FIG. 6B is an illustration showing an example of content of a pattern table in FIG. 6A;

FIG. 6C is an illustration showing an example of content of the pattern table in FIG. 6A, in the second embodiment of the present invention;

FIG. 6D is an illustration showing an example of content of the pattern table in FIG. 6A, in the other embodiment of the present invention;

DESCRIPTION OF THE PREFERRED EMBODIMENT

Figure 1:
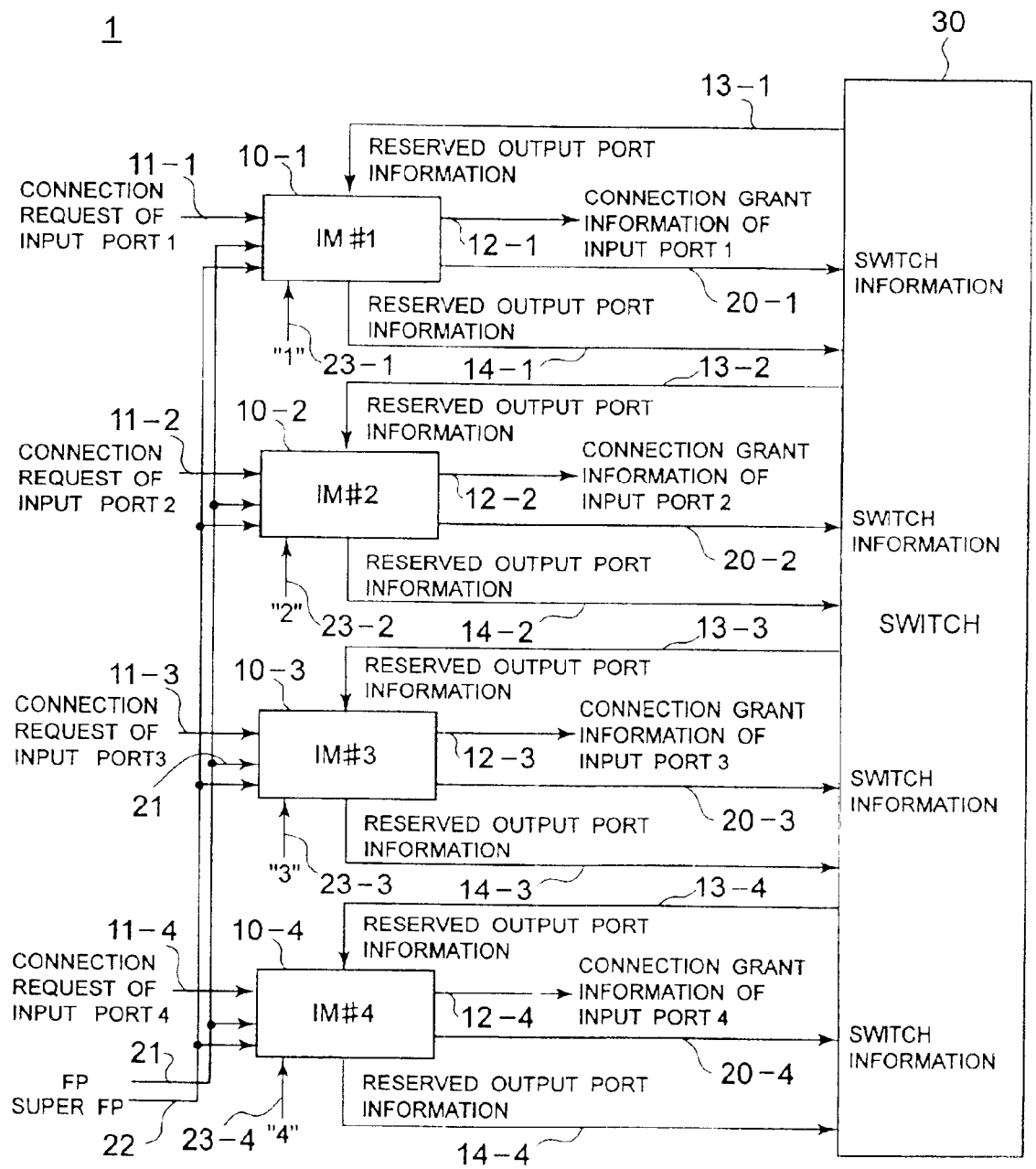
FIG. 1 is a block diagram showing a construction of the first embodiment of a packet switch according to the present invention.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

It should be noted that in the following disclosure, like components to those set forth above will be identified by like reference numerals to omit detailed description thereof in order to avoid redundant discussion and whereby to keep the disclosure simple enough to facilitate clear understanding of the present invention.

Figure 2:
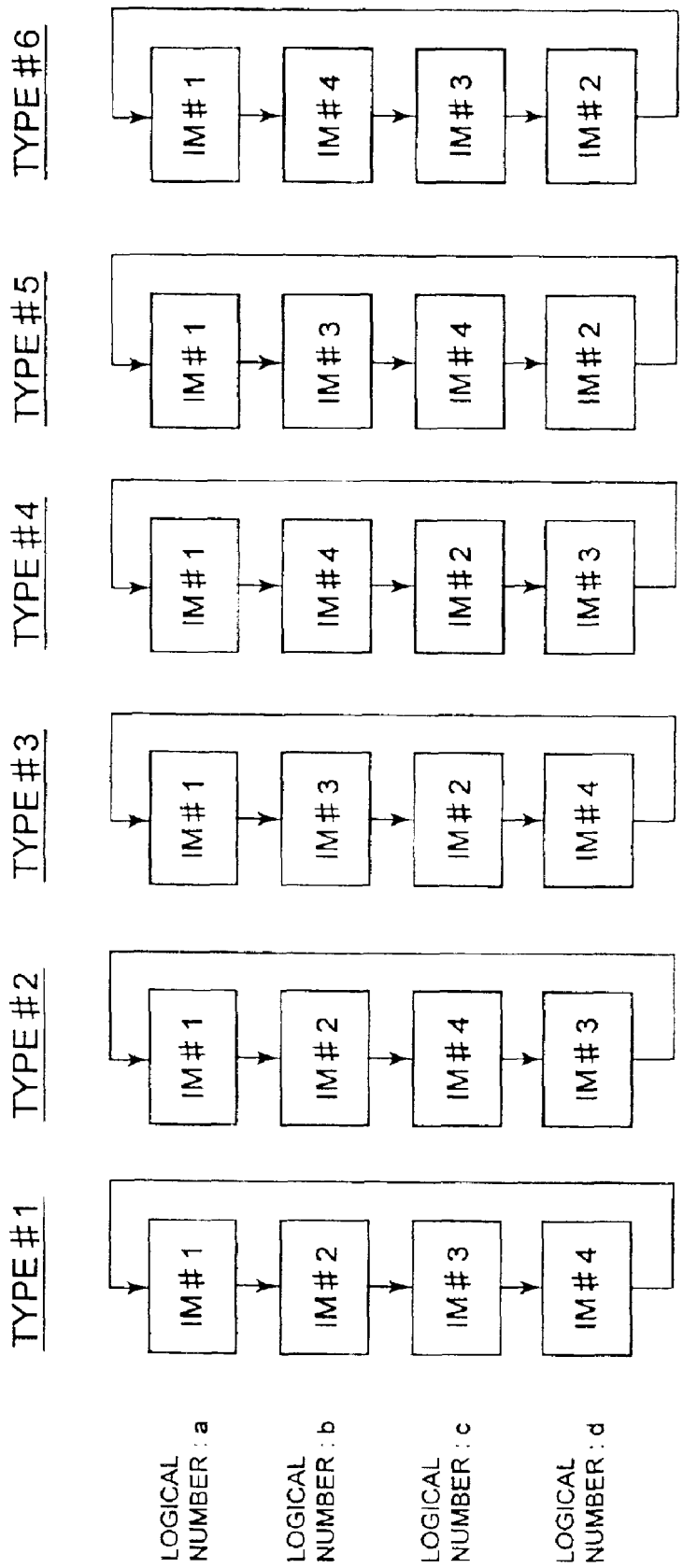
FIG. 2 is an illustration showing a connection topology of each module in the first embodiment of the packet switch according to the present invention.

Referring to FIG. 2, there is illustrated a type of connection topology of each module in the first embodiment of the present invention. The shown embodiment provides a solution for the first problem set forth above. The shown embodiment has been disclosed in terms of the system having four ports (N=4). Number of connection topologies in the case where number of ports is N, becomes circular permutation and thus becomes a factorial of (N−1) ((N−1)!). The scheduler prepares (N−1)! of connection topology patterns and uniformly generates respective topology pattern to vary connection of module to resolve unfairness concerning port reservation between adjacent modules. In case of the shown embodiment, (4−1)!=6 connection topology types are present. These six connection topology types are generated uniformly to vary connection of modules.

It is assumed that the logical module numbers are a to d and actual module numbers are 1 to 4. The reserved output port information is transferred in the order of a→b→c→d→a in the logical module numbers. Assignment of the actual module numbers in the six connection topology types is as shown in FIG. 2. For example, in Type #1, the logical number of the module of the physical number 1 is a, the logical number of the module of the physical number 2 is b, the logical number of the module of the physical number 3 is c, and the logical number of the module of the physical number 4 is d.

Figure 3:
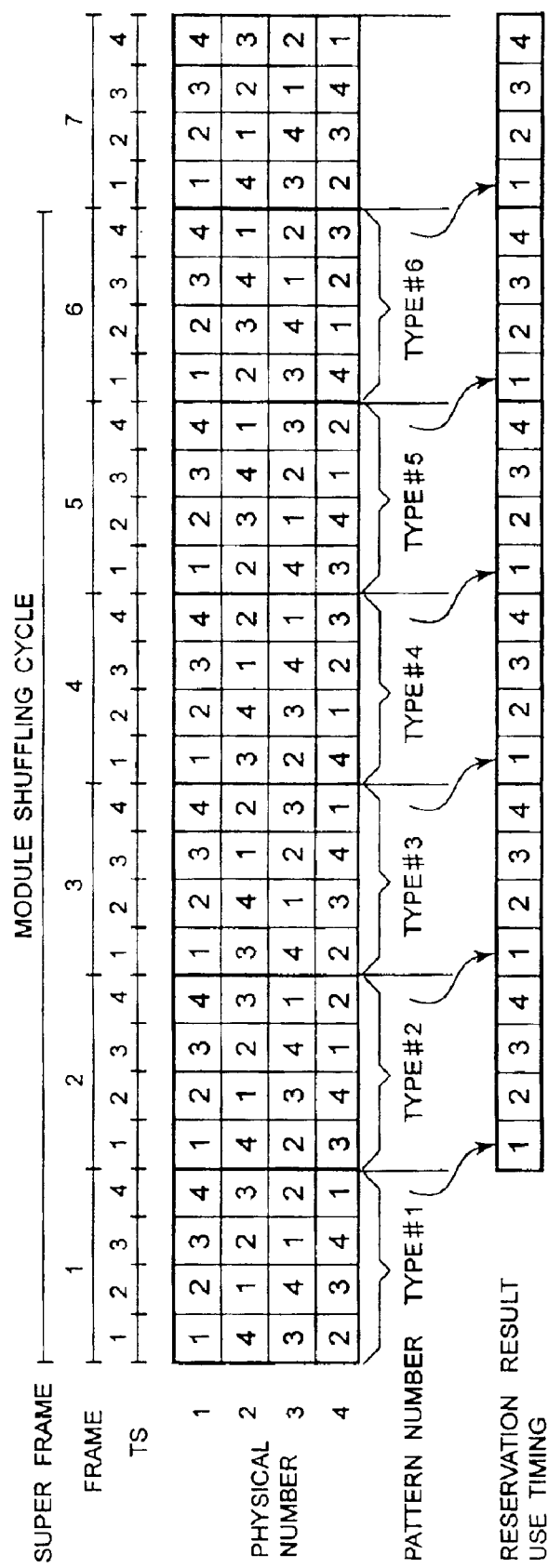
FIG. 3 is an illustration showing an order of reservation (connection grant determination) of each module in the first embodiment.
Figure 14:
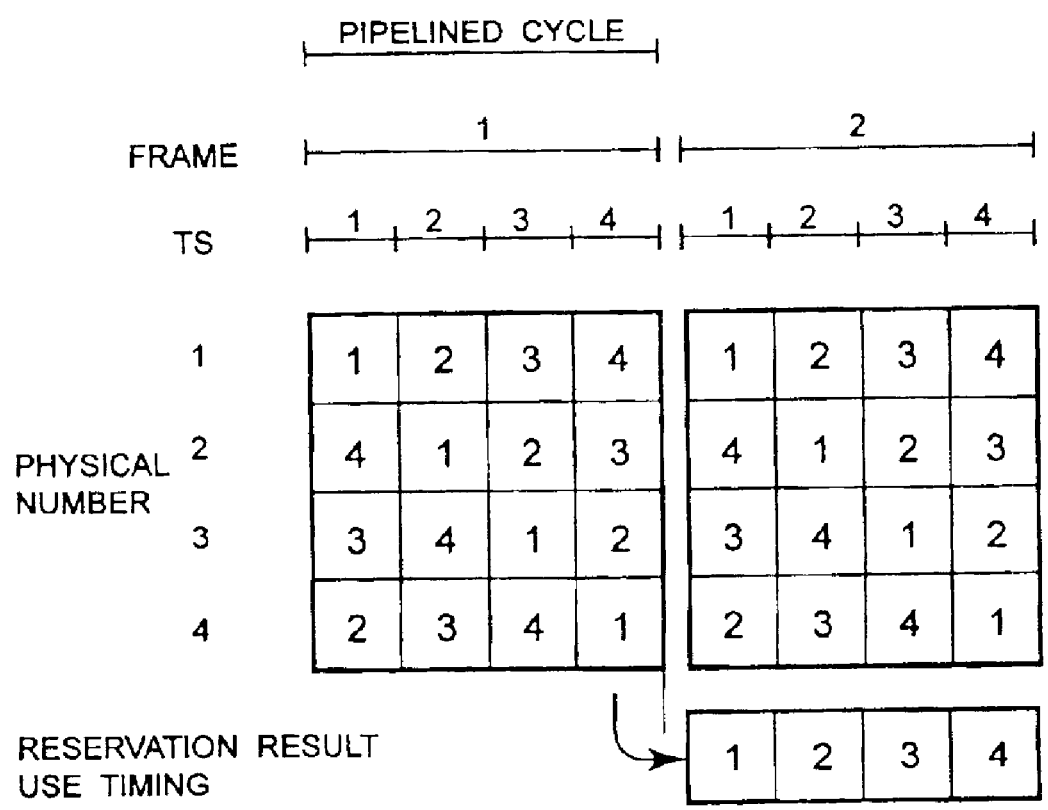
FIG. 14 is an illustration showing an order of reservation (determination of connection grant) in each module in the conventional framed RRGS.

Referring to FIG. 3, there is shown an order of reservation (determination of connection grant) of each module as one embodiment of the present invention. What are represented by the vertical axis, the horizontal axis and the figures in the matrix are the same as those in FIG. 14. The example shows the case where the number of ports N=4. A plurality of time slots form a frame. In the shown embodiment, one frame is consisted of four time slots. On the other hand, a plurality of frames form a super frame. For six frames from frame 1 to frame 6, the connection topology types 1 to 6 are applied. These six frames are combined to form the super frame. By applying the six connection topology types in order per frame, unfairness concerning port reservation between adjacent modules can be resolved. It should be noted that each frame is exemplarily illustrated with connection grant information reservation start pattern, in which the reservation start time slot of the logical number a is 1, b is 4, c is 3 and d is 2 (this is referred to as connection grant information reservation start pattern of type #A).

Referring to FIG. 1, there is shown a construction of the first embodiment of the scheduler according to the present invention. The shown embodiment is also illustrated for the case where the number of port is four (N=4). The scheduler 1 is constructed with the modules 10-1 to 10-4 in number corresponding to number of ports, and a switch 30.

To each module 10-i, the frame pulse (FP) 21 indicative of the leading end of the frame and the super frame pulse (SuperFP) 22 indicative of the leading end of the super frame are input. On the other hand, in each module 10-i, the physical number 23 is set for module identification. Also, in each module 10-i, the connection request information 11 and the reserved output port information 13 are input.

The module 10-i has a function for determining connection grant by performing negotiation of the connection request and outputting the connection grant information 12 and the updated reserved output port information 14. Each module input the reserved output port information 14 and a switch information 20 to the switch 30. The switch 30 is responsive to the switch information 20 to performing switching for the reserved output port information 13 to output to respective modules.

Here, an example of construction of respective module 10-i in FIG. 1 will be discussed with reference to FIG. 4. Referring to FIG. 4, the module 10-i is constructed with an allocator 15, a connection grant storage portion 16, a connection grant storage control portion 17, a pattern storage portion 18 and a pattern read out control portion 19.

The allocator 15 determines the connection grant information 12 of the output port for the input port managed by the module on the basis of the connection request information 11 and the reserved output port information 13. Algorithm to be used for determination of the connection grant information 12 may be known algorithm.

The connection grant storage portion 16 has a function for storing the connection grant information 12 determined by the allocator 15 up to a time of the time slot, in which the stored connection grant information is used. The connection grant storage portion 16 is constructed with a memory 160 for storing the connection grant information as shown in FIG. 5.

The connection grant storage control portion 17 determines reservation order pattern of the connection grant information in the module from the reservation order pattern of the connection grant information from the pattern storage portion 18 and the physical number 23 for module identification, in synchronism with the frame pulse 21 for controlling order of writing and reading of the connection grant information 12 per time slot. The connection grant storage control portion 17 is constructed with a writing address counter 170 for generating a writing address for the memory in the connection grant storage portion 16, a reading address counter 171 for generating a reading address of the same, and a load data generating portion 172 as shown in FIG. 5.

The load data generating portion 172 determines a connection grant information reservation start value from the connection grant information start pattern, connection topology type and the physical number 23. The writing address counter 170 takes the connection grant information reservation start value as a load data and takes the frame pulse as a load input (Load). On the other hand, the reading address counter 171 takes the frame pulse as the load input (Load). These counters 170 and 171 performs counting operation in response to a not shown clock which takes the time slot period as one period. Then, the counted values are input to the memory 160 in the connection grant storage portion 16 as the writing address and the reading address to perform writing and reading operation of the connection grant information.

The pattern storage portion 18 stores pattern information for determining the output order pattern of the connection grant information 12. As shown in FIG. 6A, the pattern storage portion 18 is constructed with incorporating a pattern table 180 which takes a pattern number as input and takes the connection topology type and the connection grant information reservation start pattern as outputs. Referring to FIG. 6B, there is illustrated a content of the pattern table 180 in the first embodiment of the present invention. In the pattern table 180, the connection topology type of Type #1 to #6 are held corresponding to respective pattern numbers from 0 to 5. On the other hand, in the shown embodiment, the connection grant information reservation start pattern of Type #A is stored in common in respective pastern numbers. By providing such content in the pattern table 180, the pattern storage portion can output the reservation order pattern of the connection grant information per connection topology pattern.

Figure 7:
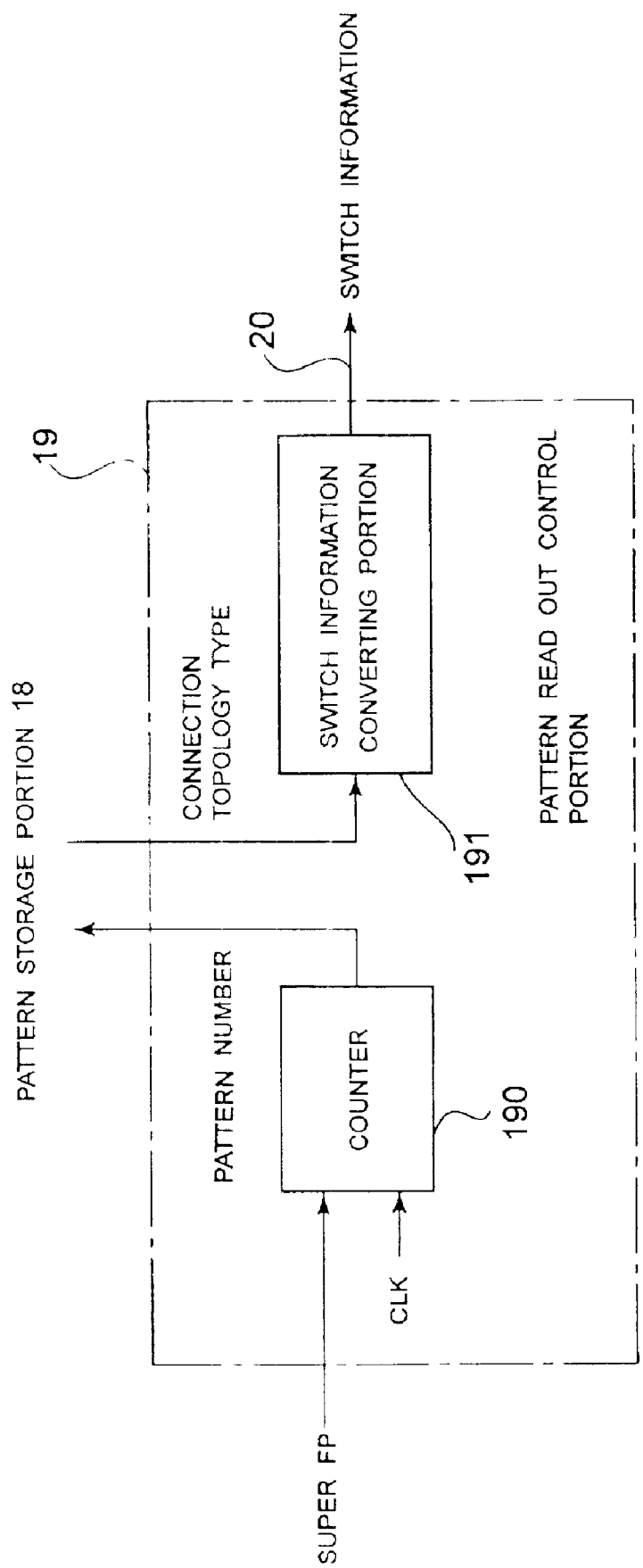
FIG. 7 is an illustration showing an example of the internal construction of a pattern reading out control portion of FIG. 4.

The pattern read out control portion 19 determines reading out of the pattern of the output order of the connection grant information 12 per frame to notify the pattern to the connection grant storage control portion 17, in synchronism with the super frame pulse. On the other hand, the pattern read out control portion 19 notifies the switch information 20 of the connection topology for the switch 30. The pattern read out control portion 19 includes a counter 190 operating in synchronism with a clock (CLK) which has a period corresponding to the period of the frame and a switch information converting portion 191 converting the connection topology type into the switch information 20 as shown in FIG. 7.

The count value of the counter 190 is increased according to inputting of the clock and is output to the pattern storage portion 18 as the pattern number. By resetting the count value at a transition timing of the super frame pulse 22, the same pattern number is transmitted to a repeat pattern storage portion 18. On the other hand, the connection topology type transmitted from the pattern storage portion 18 is input to the switch information converting portion 191. In response to this, the switch information converting portion 191 outputs the switching information 20 corresponding to the type.

Figure 8:
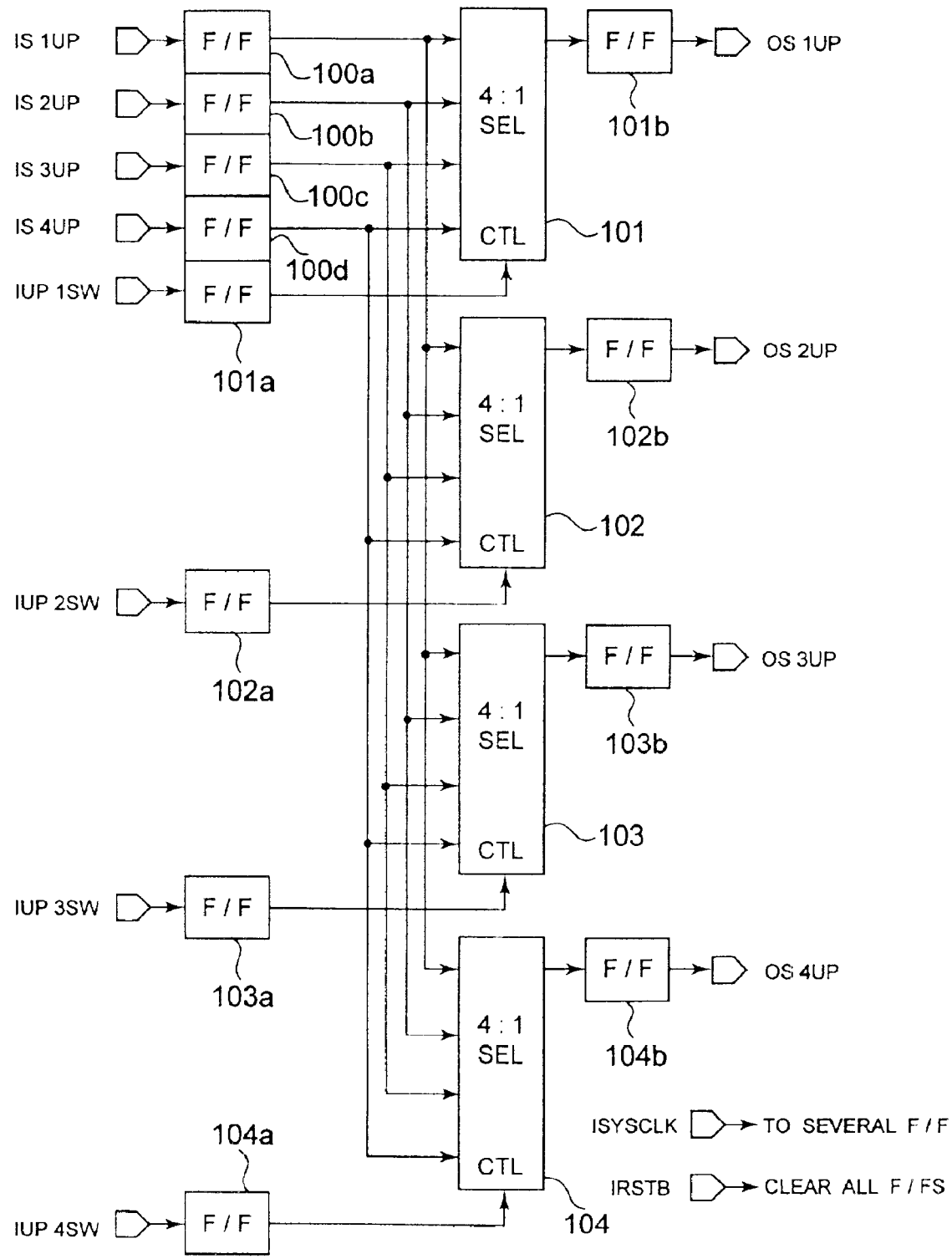
FIG. 8 is an illustration of an example of the internal construction of a switch of FIG. 1.

An example of an internal construction of the switch 30 in FIG. 1 will be discussed with reference to FIG. 8. As shown in FIG. 8, the switch 30 is constructed with a 4:1 selectors (SEL) 101 to 104 for outputting one out of four inputs, flip-flops (hereinafter abbreviate as F/F) 100a to 100d temporarily storing data to be input to the corresponding selectors provided corresponding to the selectors 101 to 104, F/Fs 101b, 102b, 103b and 104b temporarily storing data output from the corresponding selectors provided corresponding to the selectors 101 to 104, and F/Fs 101a, 162a, 103a and 104a temporarily storing switch information provided to control terminals CTL of the selectors 101 to 104.

On the other hand, in FIG. 8, to ports IS1UP to IS4UP applied data to be input to F/Fs 100a to 100d, the foregoing reserved output port information 14-1 to 14-4 are input. To ports UP1SW to UP4SW, the foregoing switch information 20-1 to 20-4 are input. The switch information 20-1 to 20-4 are input to ports IS1UP to IS4UP as information so that the 4:1 selectors 101 to 104 select mutually different inputs. From ports OS1UP to OS4UP, the reserved output port information 13-1 to 13-4 held in the F/Fs 101b, 102b, 103b and 104b are output.

In FIG. 8, respective F/Fs operate in synchronism with the system clock applied to a port ISYSCLK. On the other hand, in FIG. 8, in response to a reset signal applied to a port IRSTB, respective F/Fs become clear condition.

In the switch 30 constructed as set forth above, four kinds of reserved output port information output from respective modules 10-1 to 10-4 are respectively input to 4:1 selectors 101 to 104. In respective selectors 101 to 104, one kind of reserved output port information is selected and output. The selected reserved output port information is input to respective modules 10-1 to 10-4.

Next, operation of the shown embodiment of the scheduler will be discussed when each module 10-i performs reservation process of the port according to the order of FIG. 3.

The frame pulse 21 is input in four time slot period and the super frame pulse 22 is input in six frame period (twenty-four time slot period). In the time slot 1 of the frame 1 of FIG. 3, the module 10-i shown in FIG. 4 is input the frame pulse 21 and the super frame pulse 22. In response to this, the pattern read out control portion 19 sets the connection topology of FIG. 2 from the pattern storage portion 18 to the connection grant storage control portion 17. On other hand, the pattern read out control portion 19 outputs switch information of the connection topology type 1. Each module selects order of reservation of the connection grant information in the current from the physical number 23 for identification of the own module. For example, the module 10-1 set "1" in the physical number 23 selects the pattern of physical number 1 and frame 1 in the reservation order of the connection grant information of FIG. 3.

The switch 30 in FIG. 1 switches connection of the reserved output port information from each modules 10-1 to 10-4 to connection to be the connection topology type 1 of FIG. 2. In FIG. 1, each module 10-1 to 10-4 performs reservation according to the connection grant information reservation order in case of the connection topology type 1 in a zone of frame 1 shown in FIG. 3.

Upon completion of the frame 1 of FIG. 3, the connection grant information 12 in four time slots of the frame 2 are fixed and stored in the connection information storage portion 16 in FIG. 4. Respective modules 10-1 to 10-4 of FIG. 1 read out the connection grant information 12 from the connection information storage portion 16 in FIG. 4 depending upon the time slot using the determined connection grant information in the time slots 1 to 4 of the frame 2 of FIG. 3 to notify to the cross-bar switch and the input port to perform switching of data.

Simultaneously with notification of the connection grant information, determination of the connection grant information of the next frame is performed. When the frame pulse 21 is input in the time slot 1 of the frame 2 of FIG. 3, the pattern read out control portion 19 in FIG. 4 sets the connection topology 2 of FIG. 2 from the pattern storage portion 18 to the connection grant storage control portion 17. On the other hand, the switch information of the connection topology type 2 is output from the pattern read out control portion 19. Each module 10-$i$ selects the reservation order pattern of the connection grand information in the current frame from the physical number 23 and the set connection topology type 2 for identifying the own module.

The switch 30 in FIG. 1 performs switching so that the connection of the reserved output port information from respective modules 10-1 to 10-4 becomes as the connection topology of FIG. 2 on the basis of the switch information 20 from the modules 10-1 to 10-4. Respective modules 10-1 to 10-4 implements reservation according to the connection grant information reservation order in the case of the connection topology 2 in the zone of the frame 2 of FIG. 3. Similarly, switching of the connection topology, reservation for the next frame, and notification of the connection grant information are performed. After execution of reservation by the connection topology of the type 6, the frame pulse 21 and the super frame pulse 22 are input. The module 10 then returns the connection topology type to the type 1 to continue reservation process.

As set forth above, the connection topology is switched between respective modules 10-1 to 10-4 by the switch 30 to make all of the connection topology to appear uniformly to shuffle the preference of the chance of reservation of the input port which has been fixed otherwise, to resolve unfairness associating with the chance of making reservation of the input port.

In the first embodiment set forth above, discussion has been given for the embodiment in which the switch information for switching the reserved output port reservation information is notified from respective modules 10-1 to 10-N. By this, the packet switch can be easily formed by forming respective modules 10-$i$ in identical construction with each other, inputting the frame pulse 21 and the super frame pulse 22 to respective modules, and by externally inputting the physical number 23 for identification of the module. As set forth above, since respective modules may have the identical construction, it is suitable for mass production and whereby to lower cost. It is also considered an embodiment, in which the switch information is notified to the switch 30 from a particular module 10-$k$ (k is natural number and $1 \leq k \leq N$).

On the other hand, as a method for reading out the connection topology pattern by the module 10-$i$, there is a method to use the patterns uniformly by reading out respective patterns by the round robin. In addition, there is another method to store the patterns in the desired order to the pattern storage portion 18.

Figure 9:
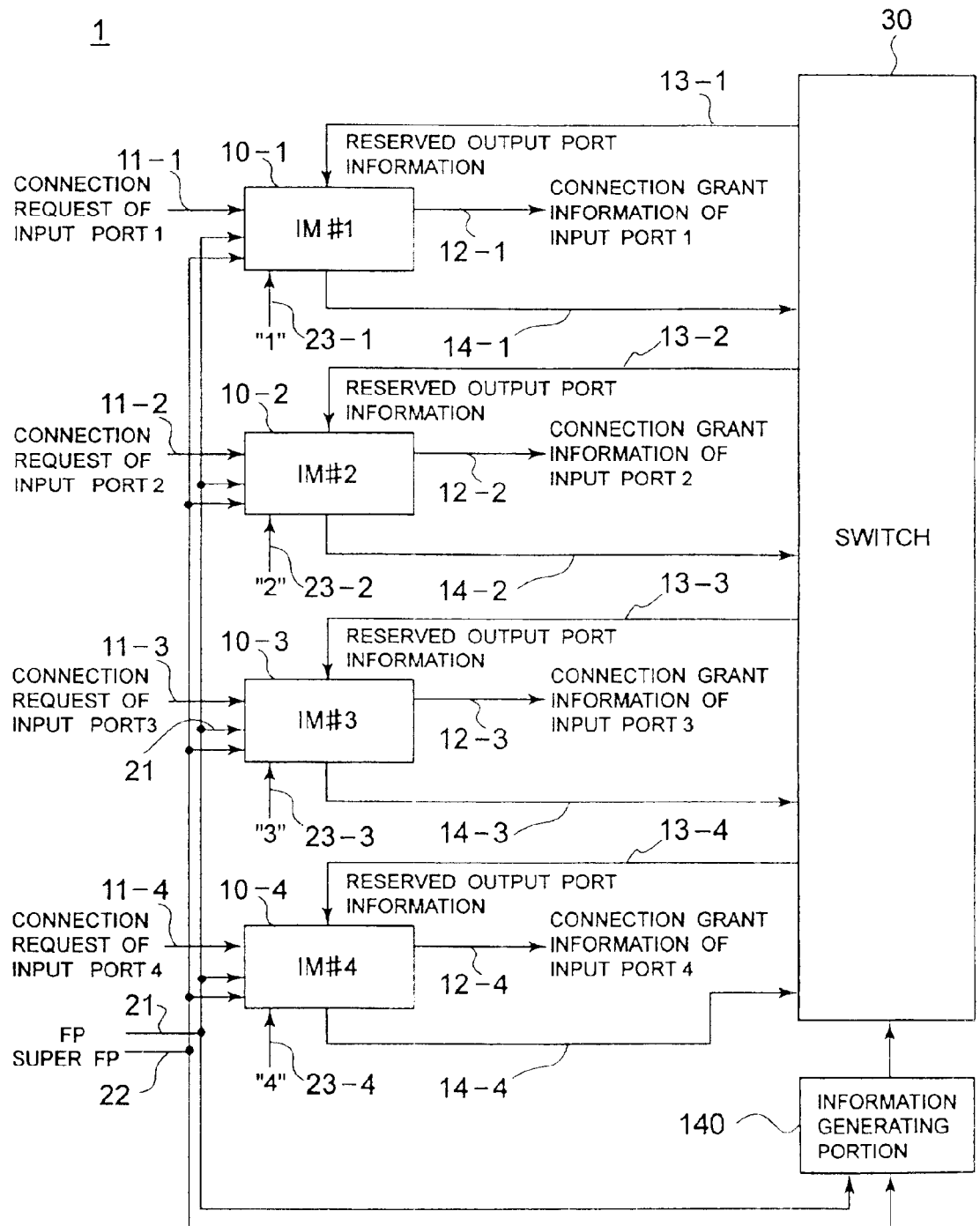
FIG. 9 is a block diagram showing a construction of the second embodiment of the packet switch according to the present invention.

Furthermore, in the foregoing embodiment, the reservation order pattern of the connection topology type and the connection grant information are renewed in synchronism with the frame pulse 21 with establishing synchronization of the variation order of the connection topology type of respective module 10-$i$ by inputting the frame pulse 21 and the super frame pulse 22 in the module 10-$i$. In addition to, it is considered another construction to externally input the connection topology and the reservation order pattern of the connection grant information, to each of modules 10-$i$. Namely, as shown in FIG. 9, it may be accomplished by providing an information generating portion 140 generating the connection topology type and the reservation order pattern. However, for establishing synchronization, it is required to input the frame pulse 21 and the super frame pulse 22 to the information generating portion 140 through a not shown signal line.

It should be noted that while in the first embodiment, the all connection topology patterns are generated uniformly, it is possible to increase appearance of particular connection topology. In such case, it is effective to enhance preference concerning chance of making reservation for the particular input port.

Figure 10:
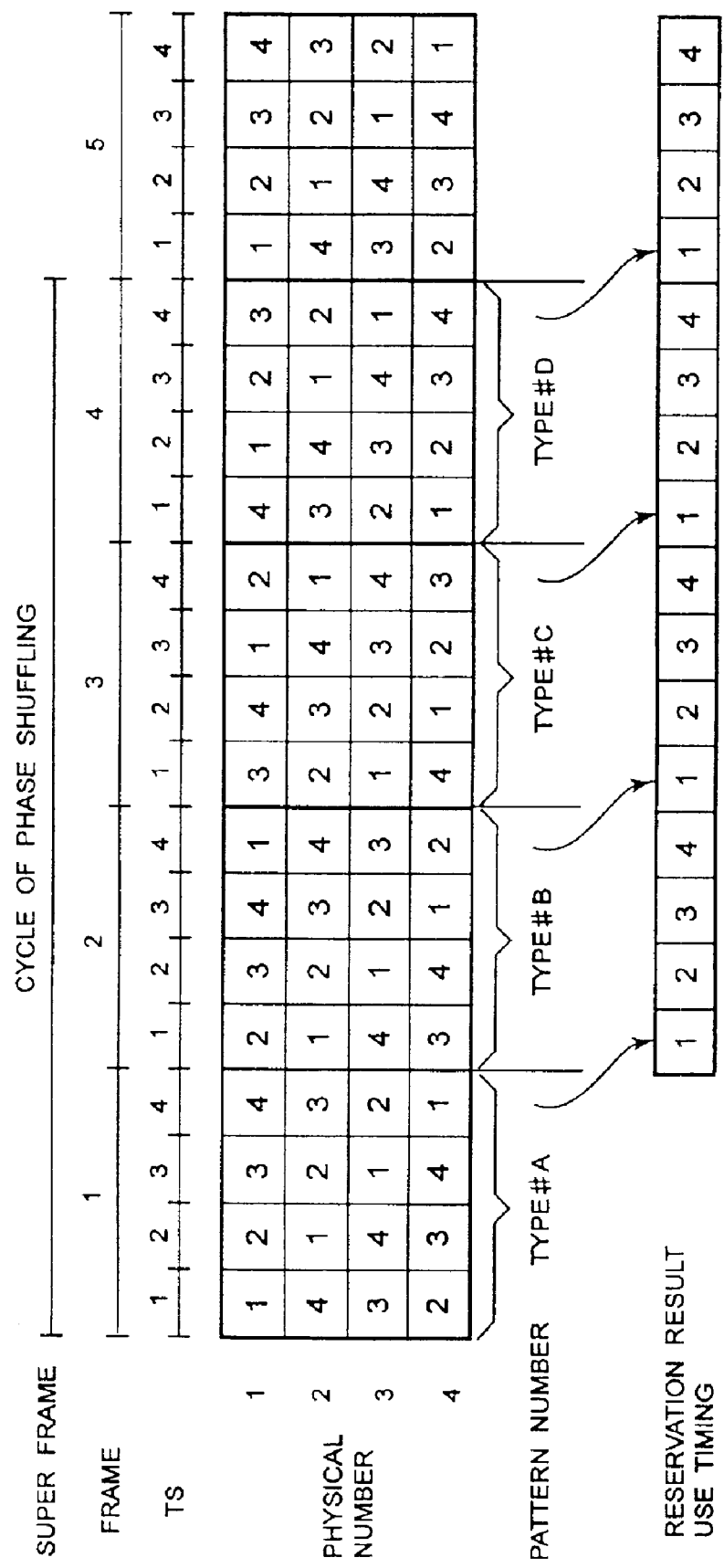
FIG. 10 is an illustration showing an order of reservation (determination of connection grant) of each module in the second embodiment of the packet switch according to the invention.
Figure 11:
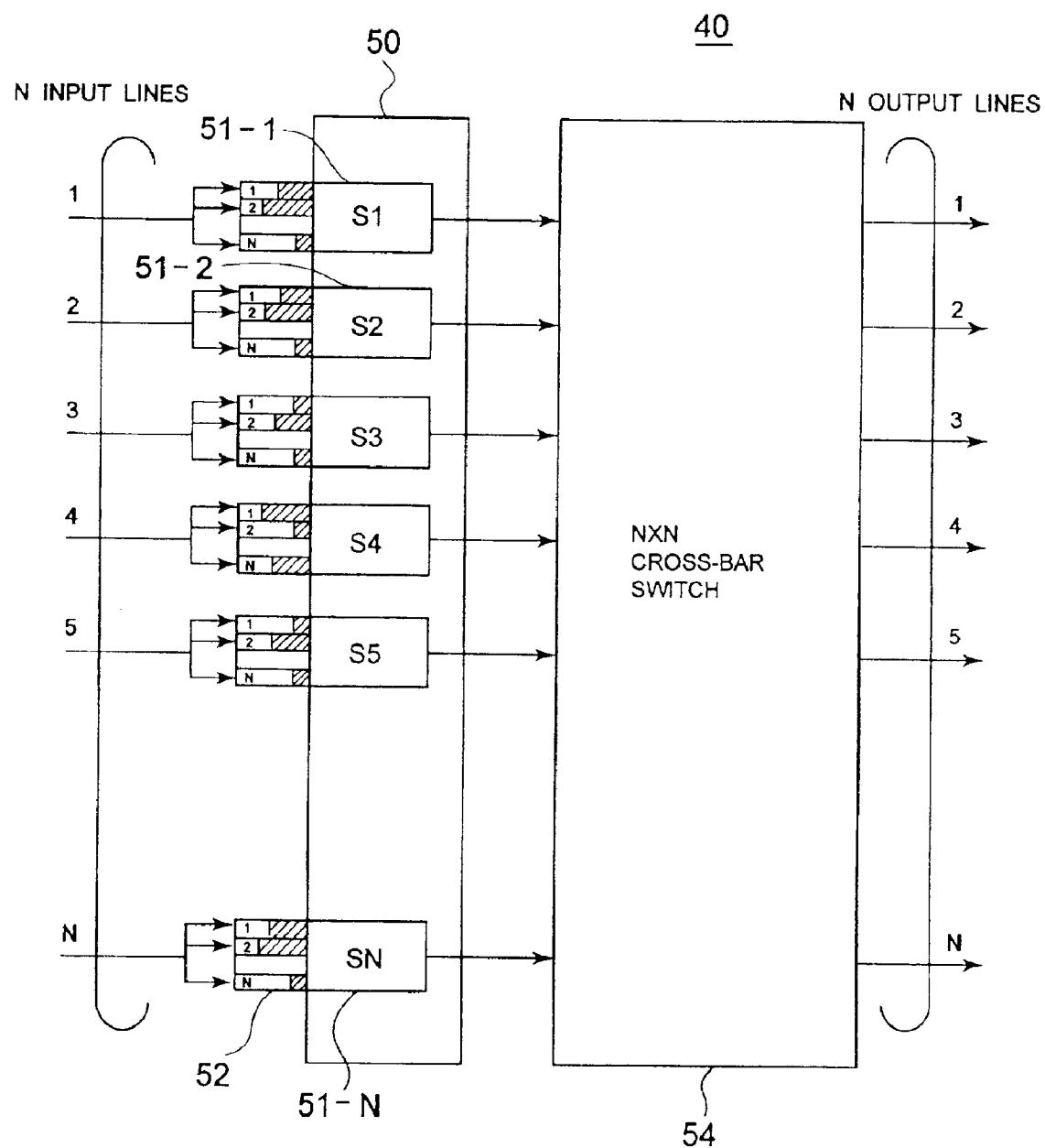
FIG. 11 is an illustration showing a typical construction of an input buffer type packet switch using VOQ.

Next, the second embodiment of the present invention will be discussed. FIG. 10 shows an order of reservation (determination of connection grant of the module 10-$i$ in the second embodiment. The shown embodiment provides a solution for the second problem in the prior art as set forth above. In FIG. 10, the contents of the vertical axis, the horizontal axis and the figures in the matrix are the same as those in FIG. 14. The shown embodiment has been illustrated in the example where number of ports is four (N=4). A frame is consisted of a plurality of time slots. In the shown embodiment, since number of the ports is four, one frame is consisted of four time slots. On the other hand, the super frame is consisted of a plurality of frames. When number of ports is N, number of cases of the time slots to initiate reservation at the leading end in the frame by the module 10-$i$ (which number of cases will he referred hereafter as "phase type"). is N. It should be noted that every frames are illustrated in Type #1 of the connection topology pattern. Namely, the logical module number of the module having physical number 1 is a, the logical module number of the module having the physical number 2 is b, the logical module number of the module having physical number 3 is c and the logical module number of the module having the physical number 4 is d.

In case of the shown embodiment, as phase types, there are four phase types i.e. Type #A to Type #D. In the Type #A, the reservation start time slot of the logical module number a is 1, the reservation start time slot of the logical module number b is 4, the reservation start time slot of the logical module number c is 3 and the reservation start time slot of the logical module number d is 2. Accordingly, the reservation start time slot of the physical number 1 is 1, the reservation start time slot of the physical number 2 is 4, the reservation start time slot of the physical number 3 is 3 and the reservation start time slot of the physical number 4 is 2. For the frames 1 to 4, the phase types A to D are applied respectively. Combining these four frames, the super frame is formed. By applying the four phase types to respective frames in sequential order, unfairness in terms of delay between respective modules can be resolved.

Figure 12:
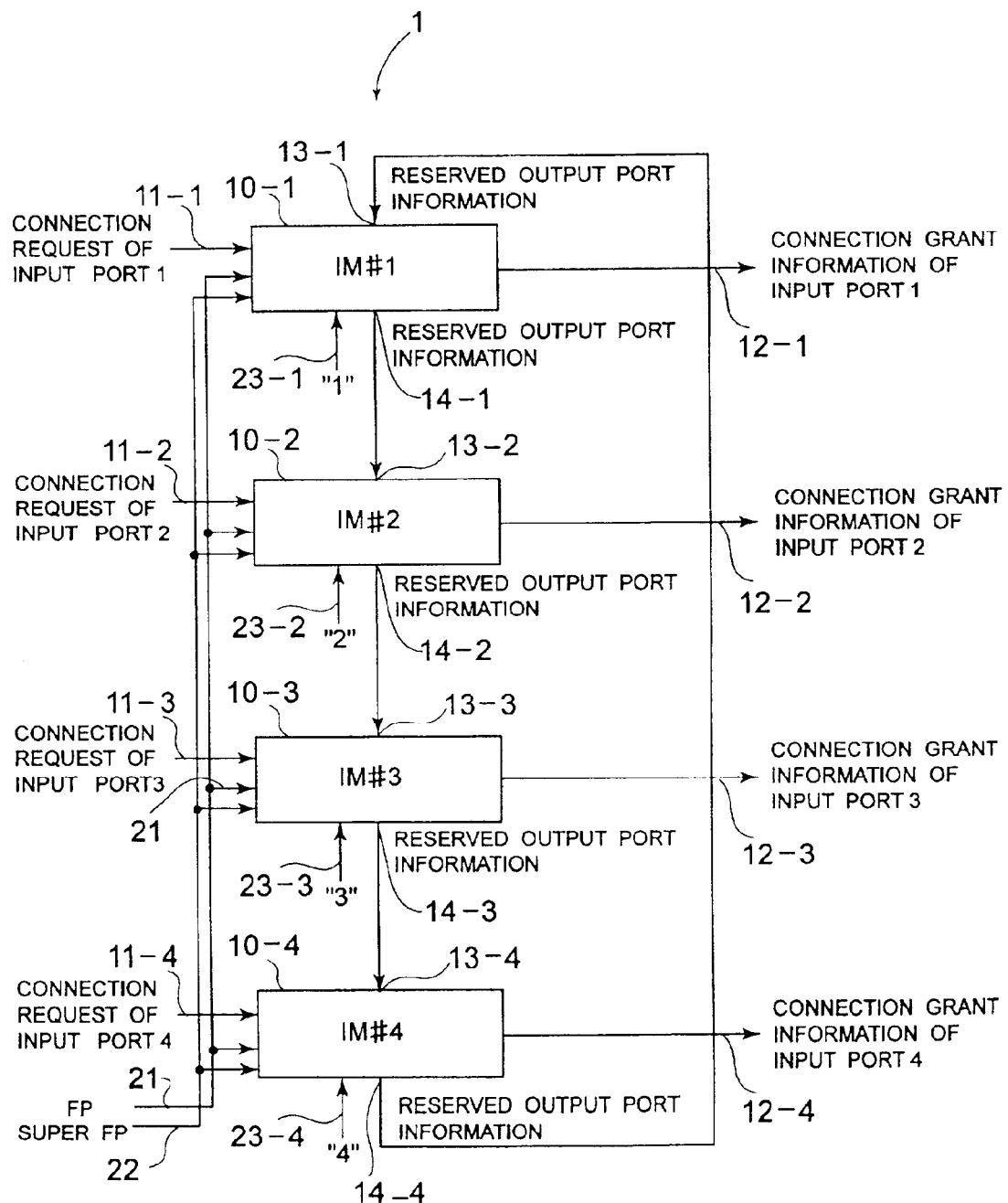
FIG. 12 is an illustration showing a typical construction of the packet switch.
Figure 13:
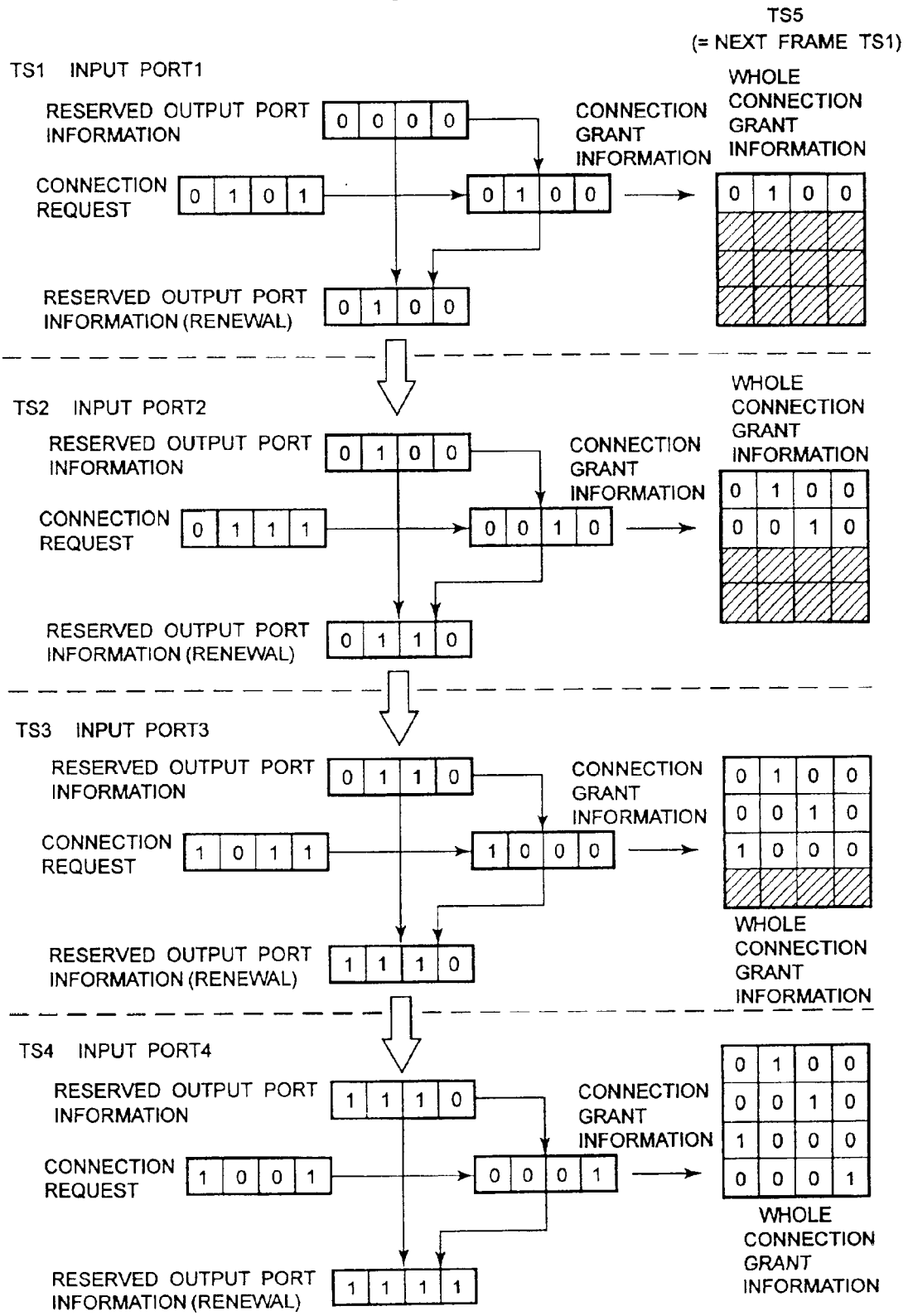
FIG. 13 is an illustration showing a determination method of the connection grant information of a framed RRGS.

The overall construction of the shown embodiment of the scheduler according to the present invention is similar to the construction illustrated in FIG. 12. Here, it should be noted that respective modules 10-1 to 10-4 in FIG. 12 are replaced with those illustrated in FIG. 4.

In each module 10-i, the frame pulse (FP) indicative of the leading end of the frame and the super frame pulse (SuperFP) indicative of the leading end of the super frame are input. The switch information 20 of the module 10-i is not used in the shown embodiment.

The pattern storage portion 18 in the module 10-i stores the pattern of the reservation order of the connection grant information. Referring to FIG. 6c, there is illustrated the content of the pattern table employed in the second embodiment of the present invention. In the pattern table 180, pattern numbers 0 to 3 corresponded to the connection grant information reservation start patterns of Types #A to #D are stored. On the other hand, in the shown embodiment, the connection topology #1 is commonly stored with respective pattern number. By providing the pattern table 180 having the contents as set forth above, the pattern storage portion 18 stores the patterns shown in FIG. 6c. By providing the pattern table 180 having the contents as set forth above, the pattern storage portion can output the reservation order patter of the connection grant information per phase pattern shown in FIG. 10.

Next, operation of the second embodiment of the scheduler according to the present invention will be discussed. Discussion will be given for the case where the reservation process of the port according to the order indicated in FIG. 10 by the distributed scheduling modules 10-1 to 10-N indicated in FIG. 12. It should be noted that the frame pulse 21 input with a period corresponding to four time slot periods and the super frame pulse 22 is input with a period of four frames (sixteen time slots period).

In the time slot 1 of the frame 1 in FIG. 10, when the frame pulse 21 and the super frame pulse 22 are input to the module 10-i shown in FIG. 4. Then, the pattern read out control portion 19 sets the phase type A in FIG. 10 from the pattern storage portion 18 to the connection grant storage control portion 17. Each module selects the reservation order pattern of the connection grant information in the current frame from the physical number 23 provided for identification of the own module and the set phase type. For example, the module 10-1 set 1 in the physical number 23, for example selects the pattern of the physical number 1 and frame 1 in the reservation order of the connection grant information in FIG. 10.

Each module 10-i performs scheduling by the framed RRGS according to order of scheduling in the case of the phase type A in the zone of frame 1. Upon completion of the frame 1 in FIG. 10, the connection grant information in the four time slots of the frame 2 are fixed and stored in the connection information storage portion 16 in FIG. 4. Each module reads out the determined connection grant information 12 from the connection information storage portion 16 in FIG. 4 over the time slots 1 to 4 of the frame 2 to notify to the cross-bar switch and the input ports for executing data transfer.

At the same time of notification of the connection grant information, determination of the connection grant information of the next frame is performed. In the time slot 1 of the frame 2 in FIG. 10, the pattern read out control portion 19 shown in FIG. 4 is responsive to the frame pulse 21 to set the phase pattern B in FIG. 10 from the pattern storage portion 18 to the connection grant storage control portion 17. Each module selects the reservation order pattern of the connection grant information in the current frame from the physical number 23 for identification of the own module and the set phase type B.

Each module 10-1 to 10-4 starts reservation according to the connection grant information reservation order in the case pf phase type B in the zone of the frame 2.

Similarly, varying of the phase type, reservation of the next frame and notification of the connection grant information are performed. After execution of reservation in the phase type D, the frame pulse 21 and the super frame pulse 22 are input. The module 10 returns the type A to continue the reservation process.

As set forth above, by varying the phase pattern of the reservation time slot between respective modules 10-1 to 10-N to make all phase patterns to appear uniformly, an average delay of the input ports which is otherwise fixed, can be shuffled. Accordingly, unfairness in terms of the average delay of the input port can be resolved.

In resolving of the unfairness in terms of the average delay of the input port, variation of the connection topology of the modules 10-1 to 10-N is not required. Therefore, the function for performing switching of the reserved output portion information outside of the module-10-i as in the first embodiment becomes unnecessary. Accordingly, even when not external circuit is added, the construction of the module the same as the first embodiment can be realized.

Similarly to the first embodiment, concerning reading out of the phase pattern, the patterns may be used uniformly by reading out using round robin. In addition, it may be considered to store respective patterns in the pattern storage portion 18 in the order which is desired to be applied.

On the other hand, in the foregoing embodiment, the frame pulse 21 and the super frame pulse 22 are input to perform switching of the phase type in the module in synchronism with the super frame. Also, in synchronism with the frame pulse, the phase type and the reservation order pattern of the connection grant information are updated. Similarly to the first embodiment, it may be considered to externally input the phase pattern and the reservation order pattern of the connection grant information.

Furthermore, while the all phase patterns are generated uniformly in the shown embodiment, it is also possible to increase frequency of appearance for the particular phase pattern to make the particular input port to reduce the average delay.

It should be noted that, in the construction of the first embodiment, fairness in terms of the average delay and fairness in reservation chance of the input port can be realized simultaneously.

The connection topology of the module 10-i corresponds to the case where the phase of the reservation start time slot is fixed. Discussing with reference to FIGS. 3 and 10, when number of ports N is 4, six kinds of reservation order in each module corresponds to the case of implementation of modification of connection in the phase type A as shown in FIG. 10. Accordingly, in case of the types B, C and D of FIG. 10, considering the pattern for which variation of connection is performed, twenty-four kinds of patterns are present. This is nothing but permutation of the module in the scheduler 1. Namely, the direct product (multiplication) of the connection topology type of the module and the phase type of the reservation start time slot becomes the permutation of the module.

In the construction of the first embodiment, by storing the permutation of the module (twenty-four kinds) in the pattern storage portion 18 storing the connection topology, in place of the connection topology (six kinds), and by inputting the super frame pulse 24 in a period of integer multiple of twenty-four frames (ninety-six time slots) to perform twenty-four kinds of reading out by the pattern read out control portion 19, fairness of the reservation chance of the input port and fairness of the average delay can be resolved simultaneously. Referring to FIG. 6D, the content of the pattern table 180 in a further embodiment of the present invention is illustrated. In the pattern table 180, all combination of the connection topology types Type #1 to #6 and the connection grant information reservation start pattern of Type #A to #D are stored with correspondence to pattern number 0 to 23.

As set forth above, the present invention may generate various combinations of adjacent ports by varying connection topology to shuffle the preference for the input port, which is otherwise fixed, for resolving unfairness in terms of the reservation chance of the input port.

On the other hand, by variation of the processing order of the reservation time slot in the process frame in the module per frame, an average value of the delay period to connection grant response for the connection request which is otherwise fixed, can be varied to realize equalization of the average value for resolving unfairness in terms of process delay of the input port.

While the present invention has been discussed in terms of the preferred embodiment, various modifications, omissions, additions and different designs without departing from the principle of the invention should be obvious to those skilled in the art. Therefore, the present invention should be understood as including all possible embodiments, modifications, omissions, additions and so forth which can be implemented without departing from the principle of the invention set forth in the appended claims.

What is claimed is:

1. A packet switch for controlling flow of data in a network, comprising:
   a plurality of input ports;
   a plurality of output ports;
   a scheduler having N (natural number) in number of input port scheduling modules reserving a particular input port among said plurality of input ports for feeding data to a designated output port among said plurality of output ports and determining connecting condition between said input port and said output port, each said input port scheduling module being a current scheduling module in relation to a preceding stage and a next stage,
   in said scheduler, each of said input port scheduling modules receiving reservation condition information of a certain time slot from the input port scheduling module in the preceding stage and determining permission or rejection of reservation of packet transmission from said preceding stage input port scheduling module in said reservation time slot, per time slot
   each of said current scheduling modules including
   means for reservation of packet transmission referring the reservation condition information received from the scheduling module in the preceding stage and the reservation request of said current scheduling module and transmitting the result of said reservation of packet transmission to the scheduling module in the next stage;
   means for defining a frame consisted of N in number of time slots and performing reservation in N time slots in a next frame in a current frame period;
   means, in the current scheduling module, for receiving said reservation condition information from the preceding scheduling module;
   means, in the current scheduling module, for preliminarily determining a future time slot to access one of said plurality of output ports as the particular time slot in the next frame;
   means for selecting one of said plurality of output ports for reservation for transmitting in said future time slot;
   means for making judgment whether said future time slot has already been reserved by another scheduling module;
   means for making reservation of said future time slot when said future time slot is not reserved by another scheduling module and putting information indicating that said future time slot is reserved in said reservation condition information;
   means for transferring said reservation condition information to next input port scheduling module,
   considering in viewpoint of reservation process in the time slot,
   said reservation process being initiated simultaneously at the leading end of the frame, being progressed simultaneously in pipeline process, and completing simultaneously at the end of the frame;
   each said input port scheduling module having
   means for initiating process for respectively different reservation time slot in the next frame in each of a plurality of said reservation processes which are initiated simultaneously at the leading end of the frame; and
   means for varying an order of said reservations by said plurality of scheduling modules
   said plurality of input port scheduling modules making reservation of ports to output with respect to a packet for next frame per each frame in the varied order.

2. A packet switch as set forth in claim 1, wherein said plurality of scheduling modules performs said reservation in an order corresponding to logical connection order relative to other modules, said reservation order varying means varies a connection topology of said plurality of scheduling modules.

3. A packet switch as set forth in claim 1, wherein said reservation order varying means includes a switch performing switching operation for varying logical connecting condition of said plurality of scheduling modules and a table storing control data for controlling switching operation of said switch.

4. A packet switch as set forth in claim 3, wherein physical connection between said plurality of scheduling modules and said varying switch is an electrical connection.

5. A packet switch as set forth in claim 3, wherein physical connection between said plurality of scheduling modules and said varying switch is an optical connection.

6. A packet switch as set forth in claim 3, wherein said table is provided in each of said plurality of scheduling modules.

7. A packet switch as set forth in claim 3, wherein said table is provide in common for said plurality of scheduling modules.

8. A packet switch as set forth in claim 3, wherein said control data is data for controlling switching operation of said switch for varying time slots for initiating reservation of said plurality of scheduling modules per each frame at the leading end of each frame.

9. A packet switch as set forth in claim 3, wherein said control data is data for realizing scheduling equalizing use frequency of reservation start slots for initiating said reservation by a plurality of scheduling modules.

10. A packet switch as set forth in claim 3, wherein said control data is data for realizing scheduling equalizing use order and use frequency of reservation start slots for initiating said reservation by a plurality of scheduling modules.

11. A packet switching method for determining connecting condition between input ports and output ports by making reservation for particular input port among a plurality of input ports for feeding data to a designated output port among a plurality of output ports in a scheduler of a switch having N in number of input port scheduling modules, each said input port scheduling module being a current scheduling module in relation to a preceding stage and a next stage, comprising:

step of receiving reservation condition information of a certain time slot from the input port scheduling module in the preceding stage;

step of determining permission or rejection of reservation of packet transmission from said preceding stage input port scheduling module in said reservation time slot, per time slot step of reservation of packet transmission referring the reservation condition information received from the scheduling module in the preceding stage and the reservation request of the current scheduling module and transmitting the result of said reservation of packet transmission to the scheduling module in the next stage;

step of receiving by the current scheduling module said reservation condition information from the preceding scheduling module;

step of preliminarily determining by the current scheduling module a future time slot to access one of said plurality of output ports as the particular time slot in the next frame;

step of selecting one of said plurality of output ports for reservation for transmitting in said future time slot;

step of making judgment whether said future time slot has already been reserved by another scheduling module;

step of making reservation of said future time slot when said future time slot is not reserved by another scheduling module and putting information indicating that said future time slot is reserved in said reservation condition information;

step of transferring said reservation condition information to next scheduling module, considering in viewpoint of reservation process in the time slot, said reservation process being initiated simultaneously at the leading end of the frame, being progressed simultaneously in pipeline process, and completing simultaneously at the end of the frame;

step of initiating process for respectively different reservation time slot in the next frame in each of a plurality of said reservation processes which are initiated simultaneously at the leading end of the frame; and step of varying an order of said reservations by said plurality of scheduling modules, and making reservation of ports to output with respect to a packet for next frame per each frame in the varied order.

12. A packet switching method as set forth in claim 11, wherein said plurality of scheduling modules performs said reservation in an order corresponding to logical connection order relative to other modules, said reservation order varying means varying a connection topology of said plurality of scheduling modules.

13. A packet switching method as set forth in claim 11, wherein said reservation order varying means includes a switch performing switching operation for varying logical connecting condition of said plurality of scheduling modules and a table storing control data for controlling switching operation of said switch.

14. A packet switching method as set forth in claim 13, wherein physical connection between said plurality of scheduling modules and said varying switch is an electrical connection.

15. A packet switching method as set forth in claim 13, wherein physical connection between said plurality of scheduling modules and said varying switch is an optical connection.

16. A packet switching method as set forth in claim 13, wherein said table is provided in each of said plurality of scheduling modules.

17. A packet switching method as set forth in claim 13, wherein said table is provide in common for said plurality of scheduling modules.

18. A packet switching method as set forth in claim 13, wherein said control data is data for controlling switching operation of said switch for varying time slots for initiating reservation of said plurality of scheduling modules per each frame at the leading end of each frame.

19. A packet switching method as set forth in claim 13, wherein said control data is data for realizing scheduling equalizing use frequency of reservation start slots for initiating said reservation by a plurality of scheduling modules.

20. A packet switching method as set forth in claim 13, wherein said control data is data for realizing scheduling equalizing use order and use frequency of reservation start slots for initiating said reservation by a plurality of scheduling modules.

* * * * *